UNITED STATES PATENT OFFICE.

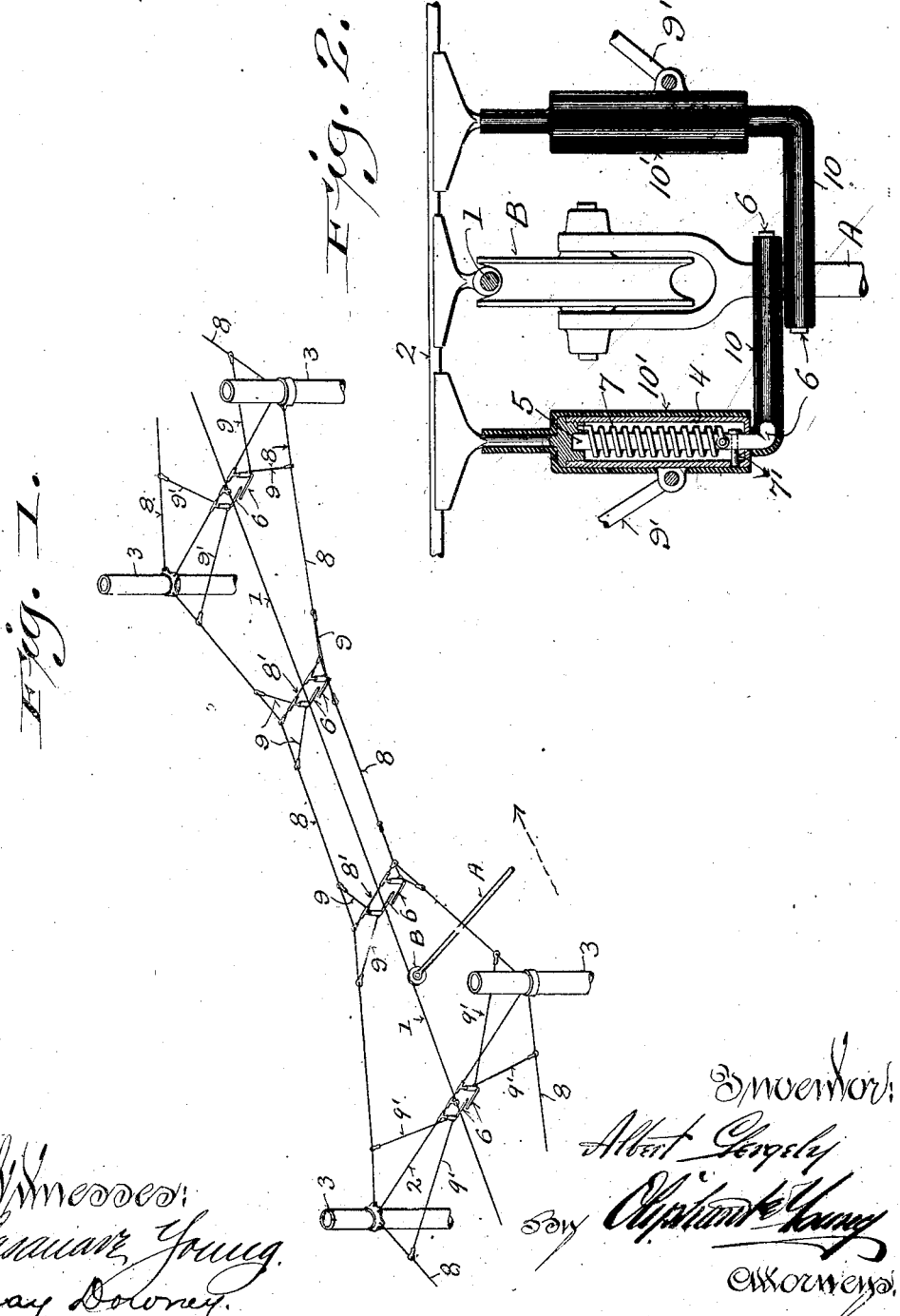

ALBERT GERGELY, OF MILWAUKEE, WISCONSIN.

GUARD FOR OVERHEAD TROLLEY-WIRES.

1,048,066.   Specification of Letters Patent.   Patented Dec. 24, 1912.

Application filed August 9, 1912. Serial No. 714,182.

*To all whom it may concern:*

Be it known that I, ALBERT GERGELY, a subject of the Emperor of Germany, and resident of Milwaukee, in the county of Milwaukee and State of Wisconsin, United States of America, have invented certain new and useful Improvements in Guards for Overhead Trolley-Wires; and I do hereby declare that the following is a full, clear, and exact description thereof.

The object of my invention is to provide a simple, economical and efficient hanger-guard for preventing the ends of a broken live feed wire of an overhead trolley system from falling to the ground or to such elevation with respect thereto that said ends will be liable to contact with persons or animals and thereby endanger life, such accidents being frequent under ordinary conditions.

With the above in view I provide spring-controlled horizontally swinging lapped fingers that constitute emergency supports for the feed wire. Preferably, pairs of these fingers are suspended under the feed wire at suitable intervals and connected by wire cross-braces whereby the trolley pole in its travel will engage said lapped fingers and cause the same to open under spring resistance incidental to movement of the trolley. Hence it will be seen that the hangers are so arranged that they will not interfere with the passage of said trolley and should the feed wire break at any point, the loose ends thereof that drop, will not be of sufficient length as to contact with the ground, but will remain in suspension at a sufficient height therefrom to prevent accidental contact with traffic.

With the above object in view the invention consists in what is herein shown, described and claimed.

In the drawings Figure 1 represents a diagram view in perspective of an overhead trolley-wire system having attached thereto hanger guards embodying the features of my invention, and Fig. 2, an enlarged detail cross-section of one pair of the hanger-guards showing the position of the trolley relative thereto.

Referring by characters to the drawings, 1 represents a trolley-wire which is suspended from the usual cross wires 2 that are supported by pairs of posts 3, which construction is ordinarily employed in supporting systems for overhead trolley wires. Secured to each cross wire 2 are barrels 4 which barrels have journaled therein pintles 5, the lower ends of which project through the barrels and are merged into horizontally disposed lapped fingers 6 as best shown in Fig. 2, the said fingers constituting guards for the feed wire under which they project. Coiled about the pintle portions 5 of the fingers are coiled springs 7 each of which springs has an end that is fast to the barrel, the opposite end being secured to said pintle. Each pintle is also provided with a stud 7' that projects into a slot formed in the barrel whereby movement of the swinging finger is limited. Thus the coiled spring serves to normally hold the fingers transversely of the feed wire, each of said fingers being held in this position by engagement of its stop-pin with one end of the slot. The fingers as shown are adapted to be swung in one direction only but it should be understood that said fingers may be provided with springs of any suitable construction which will hold them in their normal transverse position and permit swing in both directions if desired. However in the illustration shown the swing of the fingers is permitted, only in the direction of travel of the trolley pole A, which carries the usual trolley-wheel B that is adapted to engage the trolley wire 1.

Between each pair of poles 3 there are placed two or more sets of the guard-hangers, which sets are similar to the one just described, said intermediate sets being supported by longitudinally disposed guy wires 8, the ends of said guy-wires being secured to the poles 3 as shown. These guy-wires are also cross connected by wire sections 8' which are disposed above the feed-wire. The lower ends of the barrels of the intermediate guard-hangers are connected by brace wires 9 whereby said barrels are held rigidly in a vertical direction in opposition to force due to engagement of the fingers by the trolley pole. The cross wire guard hangers are also suitably braced by wires 9' that connect the lower ends of the guard-hanger barrels with the guy-wires 8. Hence it will be seen that each set of guard fingers are rigidly suspended in the desired position.

While I have shown a simple method of suspending the pairs of guard-hangers it should be understood that any means, such as come within the scope of the appended claims, may be employed for accomplishing the desired result.

Provision is made for insulating the hanger-guard members whereby short circuit of the current is prevented through contact with the trolley pole, the insulation shown being in the form of a tubing 10 which is preferably rubber or analogous insulating material, the tubing being fitted over the finger portion 6 and the barrels 4 which carry the pintles are also provided with an insulating tubing 10'.

It will be observed that the hangers are located under the feed wire at predetermined regular intervals throughout its length, the distance between each set being less than the height of the feed wire from the ground and hence should breakage occur of the feed wire at any point intermediate of the sets of hanger guards the loose ends will be supported thereby in such position that when they drop they will remain at a sufficient height from the ground to prevent contact therewith or at such height that traffic may pass thereunder without liability of engaging the ends, the height from the ground of the loose ends of the wire being determined by the distance between the hanger guards. It is apparent that by this arrangement of guards the travel of the trolley upon the feed wire will not be interrupted as the finger portions of the guards will open under spring resistance as they are successively engaged by the trolley pole as the car travels in the direction indicated. Thus the fingers will open to permit the trolley-pole to pass and automatically close under the feed wire incidental to said passage so that said feed wire is protected at all times in the manner stated.

I claim:

1. A hanger-guard for trolley-wires comprising pairs of barrels, pintles journaled in the barrels, a coiled spring having one end secured to each pintle, the opposite end being secured to the barrel, means for limiting movement of each pintle, fingers extending from the pintles transversely of the trolley-wire and adapted to lap each other, insulating covers for the barrels and fingers, and suspension means for the barrels.

2. An overhead trolley-wire system comprising a feed-wire, cross-wires for supporting the same, barrels secured to the cross-wires, spring-controlled hinged guard fingers mounted within the barrels, the ends of the guard fingers being adapted to overlap each other, longitudinally arranged guy-wires connecting the cross-wires, and a series of sets of intermediate hinged guard fingers supported by the guy-wires.

3. An overhead trolley-wire system comprising sets of posts, cross-wires connecting the sets of posts, a trolley-wire in connection with the cross-wires, a series of spring-controlled pairs of hinged guard fingers disposed under the trolley-wire and arranged at predetermined distances apart throughout the length of said trolley-wire, and means for supporting the pairs of guard fingers.

In testimony that I claim the foregoing I have hereunto set my hand at Milwaukee in the county of Milwaukee and State of Wisconsin in the presence of two witnesses.

ALBERT GERGELY.

Witnesses:
N. E. OLIPHANT,
M. E. DOWNEY.